US009360743B2

(12) United States Patent
Battaglia

(10) Patent No.: US 9,360,743 B2
(45) Date of Patent: Jun. 7, 2016

(54) SUPPORT HEAD FOR VIDEO-PHOTOGRAPHIC EQUIPMENT

(71) Applicant: LINO MANFROTTO + CO. S.p.A., Cassola (VI) (IT)

(72) Inventor: Federico Battaglia, San Giuseppe di Cassola (VI) (IT)

(73) Assignee: LINO MANFROTTO & Co. S.p.A., Cassola (PD) (IT)

( * ) Notice: Subject to any disclaimer, the term of this patent is extended or adjusted under 35 U.S.C. 154(b) by 0 days.

(21) Appl. No.: 14/653,861

(22) PCT Filed: Dec. 11, 2013

(86) PCT No.: PCT/EP2013/076204
§ 371 (c)(1),
(2) Date: Jun. 19, 2015

(87) PCT Pub. No.: WO2014/095514
PCT Pub. Date: Jun. 26, 2014

(65) Prior Publication Data
US 2015/0370148 A1 Dec. 24, 2015

(30) Foreign Application Priority Data

Dec. 19, 2012 (IT) .............................. PD2012A0387

(51) Int. Cl.
*G03B 17/00* (2006.01)
*G03B 17/56* (2006.01)
(Continued)

(52) U.S. Cl.
CPC ........... *G03B 17/561* (2013.01); *F16M 11/041* (2013.01); *F16M 11/043* (2013.01); *F16M 11/10* (2013.01); *F16M 11/12* (2013.01); *F16M 11/2014* (2013.01); *F16M 11/2028* (2013.01)

(58) Field of Classification Search
CPC ....................................................... G03B 17/561
USPC ........................................................... 396/428
See application file for complete search history.

(56) References Cited

U.S. PATENT DOCUMENTS 5,839,704 A   11/1998  Appleman
7,047,846 B1   5/2006  Hu
(Continued)

FOREIGN PATENT DOCUMENTS

WO   2011056498 A2   5/2011

OTHER PUBLICATIONS

International Preliminary Report on Patentability in PCT/EP2013/076204, dated Jan. 12, 2015.
(Continued)

*Primary Examiner* — Clayton E LaBalle
*Assistant Examiner* — Dennis Hancock
(74) *Attorney, Agent, or Firm* — Krishna Castellano; Castellano PLLC

(57) ABSTRACT

Support head (1) for video-photographic equipment comprising a base (2) intended to be fixed to a support structure, at least one body (3, 4, 5) rotating with respect to said base (2) so as to rotate about a respective rotation axis (X, Y, Z) defined on said head (1), a telescopic activation device (30, 40, 50) of said at least one body (3, 4, 5) for rotating said body with respect to said rotation axis (X, Y, Z) comprising a shaft (31, 41) extending along a longitudinal axis (A, B) fixed to a first end thereof (31a, 41a) to said at least one body (3, 4, 5) and a handle (32, 42) associated with a second end (31b, 41b) of said shaft (31, 41) longitudinally opposite to said first end (31a, 41a), said handle (32, 42) being slidable with respect to said shaft (31, 41) so as to be displaceable along said longitudinal axis (A, B) between a working configuration (W), wherein said handle (32, 42) is positioned for controlling the rotation said at least one body (3, 4, 5) about said rotation axis (X, Y, Z) and a non-working configuration (W') of minimum size, wherein said handle (32, 42) is in a position close to said at least one body (3, 4, 5).

7 Claims, 2 Drawing Sheets

(51) Int. Cl.
*F16M 11/10* (2006.01)
*F16M 11/20* (2006.01)
*F16M 11/04* (2006.01)
*F16M 11/12* (2006.01)

(56) References Cited

U.S. PATENT DOCUMENTS 9,223,189 B2 * 12/2015 Battaglia ............ F16M 11/2014

2002/0179787 A1 12/2002 Nakatani
2011/0006170 A1 1/2011 Liu et al.

OTHER PUBLICATIONS

International Search Report and Written Opinion in PCT/EP2013/076204, dated Feb. 12, 2014.

* cited by examiner

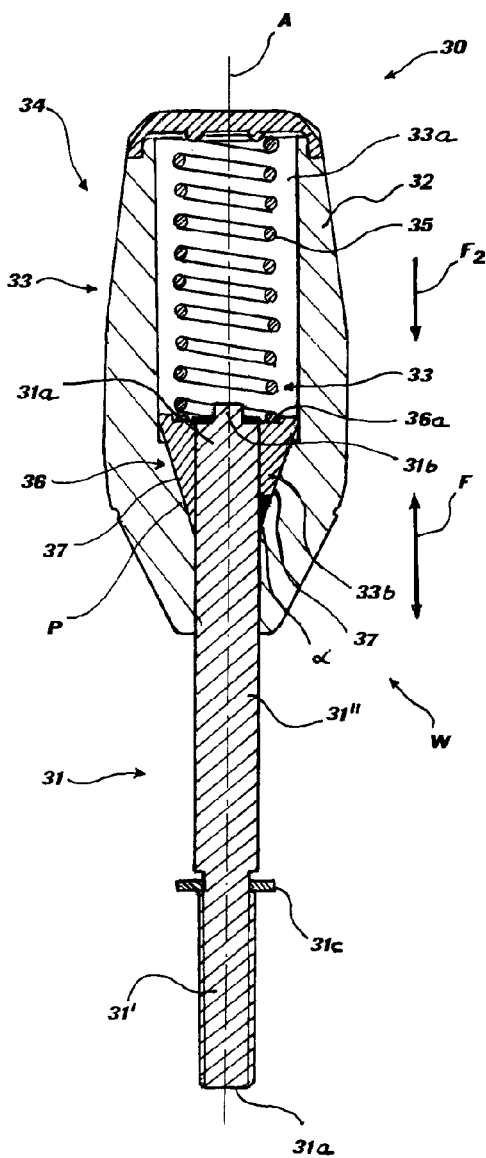
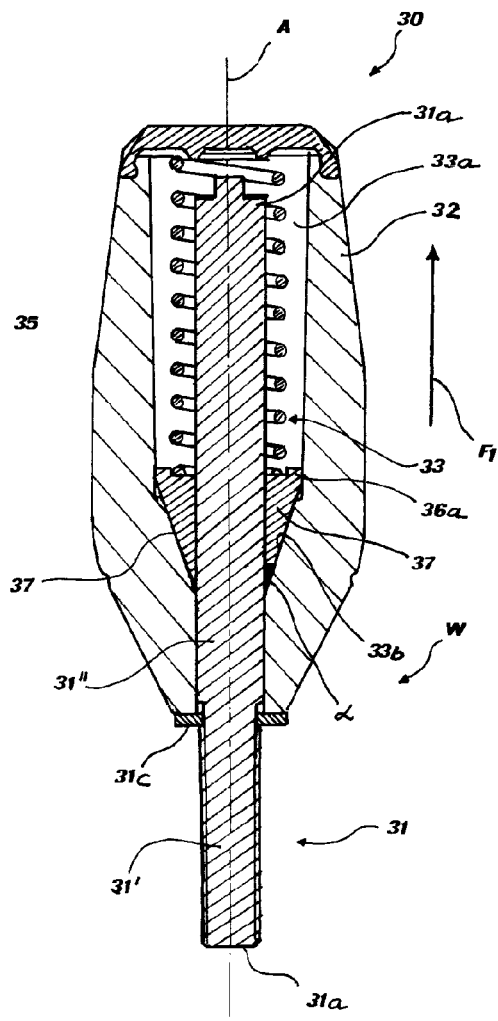
FIG.4
FIG.3

SUPPORT HEAD FOR VIDEO-PHOTOGRAPHIC EQUIPMENT

CROSS REFERENCE TO RELATED APPLICATIONS

This application is a U.S. National Stage Application of PCT/EP2013/076204 filed on Dec. 11, 2013, which claims priority to Italian patent application PD2012A000387 filed on Dec. 19, 2012, the contents of both of which are incorporated herein by reference.

TECHNICAL SCOPE

This invention relates to a support head for video-photographic equipment having the characteristics specified in the precharacterising portion of the principal claim.

TECHNICAL BACKGROUND

A support head is an accessory widely used in the video-photographic sector which makes it possible to rotate video-photographic equipment mounted on it about one or more axes of rotation.

The support head generally comprises a base, which may be provided with means of attachment to a supporting structure such as a tripod or the like, and one or more bodies are mounted one upon the other in succession from the base in such a way as to allow them to rotate about their respective rotation axes, together with an attachment plate fixed to the last of these bodies to which the video-photographic equipment can be removably attached.

The abovementioned rotation axes are normally perpendicular to each other and when the base is supported in a horizontal plane they define a vertical axis passing through the base (known as the panoramic axis), a horizontal axis parallel to the optical axis of the video-photographic equipment (known as the level axis) and a horizontal axis perpendicular to that optical axis (known as the tilt axis).

Rotation of the individual bodies around their own axes of rotation is preferably controlled by the operator by means of suitable levers extending from the corresponding bodies, which often result in extending in directions perpendicular to each other.

This configuration certainly makes it convenient to perform the actions of positioning the video-photographic equipment, but its excessive bulkiness makes the operations of transporting and storing the support head complicated.

WO 2011/056498 describes a support head in which one of the control levers can be folded back in such a way as to reduce the overall dimensions of the head when it is not in use.

In particular the lever described in that document is provided with an articulated joint in a median position along its shaft which permits the two portions of the shaft separated by the articulated joint to move between a working position in which those portions extend in mutual alignment and a non-working position in which the more distal portion of the body of the head can be folded downwards.

This solution nevertheless has some disadvantages, including the fact that its construction does not make it possible to automatically take up any play between the components of the articulated joint, resulting in the possibility of undesired oscillations between the two portions of the shaft even when the articulated joint is closed in the working position.

Another disadvantage arises from the fact that the construction of the articulated joint involves the construction and assembly of different additional components, thus increasing the overall cost of the support head.

Another disadvantage arises from the fact that the presence of the articulated joint in a visible position on the shaft may result in it being not very aesthetically pleasing, thus compromising the overall aesthetics of the support head.

Heads in which the control levers are provided with a telescopic arm that is intended to be elongated when the levers are in use and closed up when the levers and/or the head are not in use are also known.

Telescopic arms may give rise to problems because of the existence of play between the various parts of the lever arm, which do not permit optimum operation of the lever itself.

Furthermore the locking device provided for the telescopic arm has its own non-negligible dimensions and renders operation more complicated and slower, because additional actions are required from the operator in order to immobilise/release the arm.

There therefore remains a requirement for the provision of solutions which make it possible an effective reduction in the dimensions of the levers in a support head without compromising the structural and functional characteristics of existing levers.

DESCRIPTION OF THE INVENTION

The problem underlying this invention is that of providing a support head for video-photographic equipment which overcomes the limitations mentioned above with reference to the known prior art.

Within the context of this problem one object of the invention is to provide a support head which is reliable, of simple construction and reduced cost.

This problem is resolved and this object is accomplished through this invention by means of a support head constructed in accordance with the following claims.

BRIEF DESCRIPTION OF THE DRAWINGS

The characteristics and advantages of this invention will be more apparent from the detailed description of a preferred embodiment illustrated by way of indication and without limitation with reference to the appended drawings in which:

FIGS. 3 and 4 are views in cross-section of a detail of the support head in the preceding figures, in the working and closed configurations in FIG. 1 and FIG. 2 respectively, viewed along their corresponding longitudinal axes.

PREFERRED EMBODIMENT OF THE INVENTION

Figure 1:
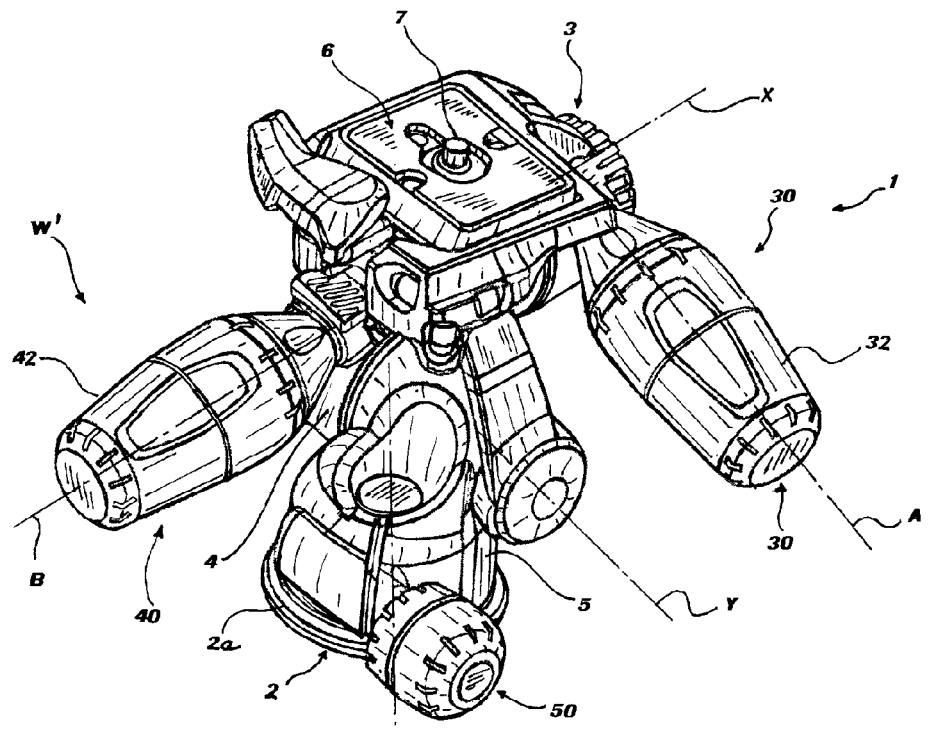
FIGS. 1 and 2 are perspective views from above of a support head for video-photographic equipment constructed in accordance with this invention in a non-working and working configuration respectively.

The Figures show a support head 1 for video-photographic equipment, which is not illustrated in the appended figures, constructed in accordance with the invention.

Support head 1 comprises a base 2 on which there is provided a supporting surface and on which are provided attaching means for enabling support head 1 to be attached to a supporting structure of the tripod or similar type, which is not illustrated in the Figures.

Support head 1 also comprises a first body 3, a second body 4 and a third body 5 which are mutually attached to each other in such a way as to enable them to rotate about a first axis X, a second axis Y and a third axis Z of head 1 respectively.

In more detail, first body 3 is rotatably attached to second body 4 through suitable coupling means 3' in such a way that it can rotate about a first axis X.

First body 3 is also provided with an attachment plate 6 designed to support video-photographic equipment and provided with removable attachment means, such as a threaded post 7 which can engage the video-photographic equipment to attach the video-photographic equipment fixedly but removably to head 1.

Attachment plate 6 and first body 3 are shaped in such a way that first axis X is substantially parallel to the optical axis of the video-photographic equipment, the positioning of which on attachment plate 6 is predetermined in such a way as to constitute the level axis of head 1.

Attachment plate 6 is preferably removable from first body 3, according to characteristics and means which are known in the art.

Similarly second body 4 is rotatably attached to third body 5 in such a way as to rotate about a second axis Y arranged in such a way that it is substantially perpendicular to first axis X, but parallel to surface 2a of base 2, thus forming the tilt axis of head 1.

In turn third body 5 is rotatably attached to base 2 in such a way that it rotates about third axis Z, which extends perpendicular to both the first and second axes X and Y and surface 2a, thus forming the panoramic axis of support head 1.

Each body 3, 4, 5 is provided with a friction device, not shown in the figures, to resist the rotation of each of bodies 3, 4, 5 about their corresponding rotation axes X, Y, Z. Each body may also be provided with a locking device which may be activated/deactivated to lock/release rotational movement of each body about the corresponding rotation axis X Y, Z, as is more particularly described below.

Bodies 3, 4, 5 are respectively provided with a first 30, second 40 and third 50 activation device attached to corresponding body 3, 4, 5 and designed to rotate bodies 3, 4, 5 about their corresponding rotation axes X, Y, Z.

Figure 2:
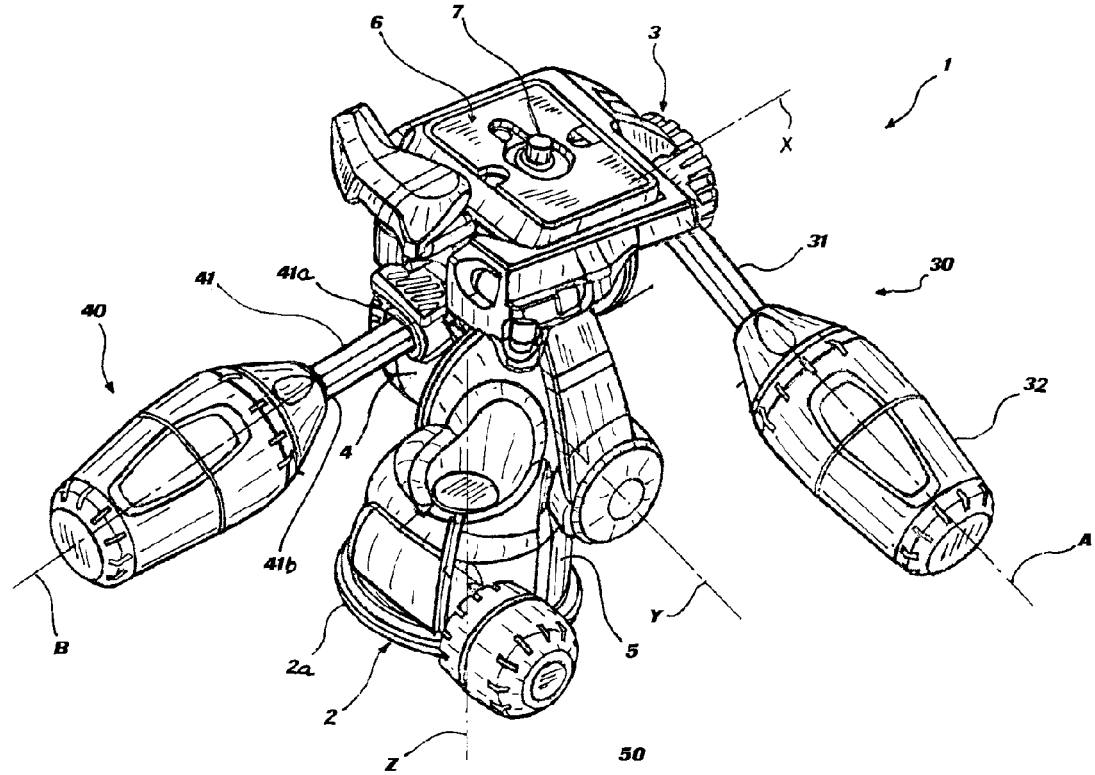

First activation device 30 and second activation device 40 are telescopic and can be moved between a working configuration W shown in FIG. 2, 4 in which the aforesaid devices are at their maximum extension along their corresponding longitudinal axes A, B, and a non-working configuration W' shown in FIGS. 1, 3 in which the dimensions of the first activation device 30 and the second activation device 40 are a minimum and reduced in comparison with the dimensions of the working configuration W, as is more particularly described below.

Non-working configuration W' is a closed configuration and is used for example to transport or store head 1.

First activation device 30 comprises a first shaft 31 extending from first body 3 along a longitudinal axis L and attached at a first end thereof 31a to first body 3 and a handle 32 associated with a second end 31b longitudinally opposite first end 31a of shaft 31 and intended to be grasped by a user to operate first activation device 30 to control the rotation of the equipment attached to head 1 along first axis X.

First end 31a of shaft 31 comprises a threaded portion so that shaft 31 can be screwed onto/off first body 3. This rotation activates the locking device for first body 3 to lock/release rotation of first body 3 about first rotation axis X respectively.

To lock the rotation of the first body 3, the operator acts on handle 32, rotating it for example clockwise about longitudinal axis A to screw the threaded portion of first end 31a into first body 3 in such a way as to activate the locking device for first body 3 and impeding the rotation thereof.

To allow first body 3 to rotate the operator rotates handle 32 about longitudinal axis A in an anti-clockwise direction to unscrew the threaded portion of first end 31a of first body 3 in such a way as to deactivate the locking device for first body 3.

Shaft 31 and handle 32 are associated together telescopically to vary the overall extension of first activation device 30 along longitudinal axis A.

In particular handle 32 can move along longitudinal axis A in both directions of arrow F in FIG. 4, to be positioned alternately in the working configuration W in which handle 32 is positioned to control rotation of first body 3 about first rotation axis X and a non-working configuration W' of minimum dimensions of first activation device 30 in which handle 32 moves laterally along longitudinal axis A towards first body 3 in comparison with working configuration W. In the non-working configuration W' handle 32 is located in a position close to third body 3 in order to reduce the overall dimensions of first activation device 30 and therefore head 1.

Second activation device 40, which is intended to control rotation of the equipment attached to head 1 about second axis Y, is structurally and functionally similar to first activation device 30, as a result of which it will not be described in detail and parts corresponding to those in first activation device 30 will be indicated by corresponding reference numbers.

Second shaft 41 and second handle 42 are mutually associated telescopically to vary the overall extension of second activation device 40 along corresponding longitudinal axis B, in particular second handle 42 can move laterally along longitudinal axis B to be positioned in working configuration W in which second handle 42 is positioned to control rotation of second body 4 about a second rotation axis Y and a non-working configuration W' in which second handle 42 is positioned close to second body 4 in comparison with working configuration W alternately. Thus in non-working configuration W' the overall dimensions of second activation device 40 and therefore head 1 are reduced.

The telescopic nature of first and second activation devices 30, 40 makes it possible to provide head 1 of the invention with activation devices 30, 40 and in particular shafts 31, 41 which extend appropriately along their corresponding longitudinal axes A, B in such a way as to achieve precise adjustment of the desired positions of bodies 3, 4 controlled by corresponding activation devices 30, 40 and therefore the equipment fixed to head 1, and at the same time to reduce the dimensions of head 1 during transport or when it is not in use.

Activation devices 30, 40 are placed in their working configuration W, that is their position of maximum extension along corresponding longitudinal axes A, B, when head 1 is in use, achieving high accuracy in positioning the video-photographic equipment.

At the same time, on finishing use the operator can close up activation devices 30, 40, placing them in their non-working configuration W', that is the closed transport configuration, thus appreciably reducing the overall dimensions of head 1.

In this way good adjustment in positioning the equipment fixed to head 1 is achieved without at the same time having a head 1 which is excessively bulky, and vice-versa it is possible to reduce the overall dimensions of head 1 when this is no longer in use without having to abandon good positioning accuracy.

Furthermore, as non-working configuration W' is particularly compact, activation devices 30, 40 are protected from any impacts and damage while head 1 is being transported.

Preferably the two longitudinal axes A, B of first activation device 30 and second activation device 40 are arranged in such a way as to be substantially perpendicular to rotation axes X, Y of corresponding activation devices 30, 40 and perpendicular to them.

Shaft 31 comprises an annular member 31*c* secured in an intermediate position on shaft 31 between first end 31*a* and second end 31*b* and protruding transversely with respect to shaft 31.

Handle 32 is provided with a cavity 33 extending along longitudinal axis A and intended to slideably house at least one portion of shaft 31, as more particularly described below.

As mentioned above, shaft 31 and handle 32 can both slide in the direction of longitudinal axis A between working configuration W in which shaft 31 is substantially external to handle 32 and annular member 31*c* is at a distance from handle 32 and non-working configuration W' in which handle 32 is in a position close to first body 3, shaft 31 being substantially introduced into cavity 33 and annular member 31*c* abutting handle 32.

Annular member 31*c* defines a first shaft portion 31' on shaft 31 extending between first end 31*a* and annular member 31*c* and intended to be positioned outside cavity 33 of handle 32 in both working configuration W and non-working configuration W', and a second shaft portion 31" defined between second end 31*b* and annular member 31*c* intended to be received within cavity 33 of handle 32 in non-working configuration W' and to be positioned partly outside handle 32 in working configuration W. Annular member 31*c* therefore acts as an end stop member for shaft 31 in non-working position W'.

An annular member 31*d* intended to act as an end stop member for first activation device 30 in working configuration W is provided on second end 31*b* of shaft 31.

Cavity 33 comprises a cylindrical cavity 33*a* and a tapering cavity 33*b* which are contiguous with each other along longitudinal axis A and positioned in such a way as to form a single cavity 33. Tapering cavity 33*b* is provided in the part of handle 32 facing first body 3 and narrows towards first body 3. Tapering cavity 33*b* is bounded by a wall P which is inclined in relation to shaft 31.

Handle 32 is further provided with a guide device 34 to guide the sliding of shaft 31 within cavity 33.

Guide device 34 comprises a helical spring 35 located in cylindrical cavity 33*a* in the direction of longitudinal axis A and shaped so as to slideably receive shaft 31, and a friction member provided in tapering cavity 33*b* and secured to one end of spring 35 through its own annular base 36*a*.

Friction member 36 further comprises at least one wedge-shaped member 37 extending from annular base 36*a* in a direction opposite spring 35 and shaped so as to be located between shaft 31 and wall P of tapering cavity 33*b*.

Friction member 36 is used to adjust the movement of shaft 31 with respect to handle 32.

The presence of at least one wedge-shaped member 37 makes it possible to take up any play which may be present between tapering cavity 33*b* and shaft 31, improving the functioning of first activation device 30.

In particular the at least one wedge-shaped member 37 makes it possible to improve the movement of shaft 31 along longitudinal axis A in relation to handle 32 when first activation device 30 is activated.

Also, by taking out the play between shaft 31 and handle 32, wedge-shaped member 37 makes it possible for shaft 31 and handle 32 to rotate together about longitudinal axis A or to avoid any mutual rotation between shaft 31 and handle 32. This makes it possible to eliminate any undesirable play while handle 32 is being rotated to immobilise/release the rotation of first body 3.

In the version illustrated friction member 36 comprises three separate wedge-shaped members 37 located in circumferentially spaced positions on annular base 36*a* which extend from annular base 36*a* and are shaped in such a way as to be placed between shaft 31 and wall P of tapering cavity 33*b*. Each wedge-shaped member 37 is shaped in such a way that an angle $\alpha$ is defined between handle 32 and shaft 31.

Spring 35 is arranged in such a way as to push wedge-shaped members 37 against wall P of tapering cavity 33.

In this way play is prevented from occurring between shaft 31 and handle 32 and wedge-shaped members 37 press against both shaft 31 and wall P of tapering cavity 33*b*.

When in operation, when an operator decides to use head 1 he will bring first and/or second activation devices 30, 40 into working configuration W, or into the configuration of maximum extension in which shaft 31 is substantially located within handle 32.

To do this the operator grasps handle 32 pulling it along longitudinal axis A away from head 1 as indicated by arrow F1 in FIG. 3 causing first shaft portion 31' to move progressively out of cavity 33 in handle 32.

The force exerted by the operator on handle 32 is transmitted to wedge-shaped members 37 and from these to shaft 31.

Wedge-shaped members 37 apply resistance to the movement which depends on the force applied by the operator, the angle $\alpha$ of wedge-shaped member 37 and coefficient of friction $\mu$, which in turn depends on the material forming wedge-shaped members 37 and shaft 31.

Movement of shaft 31 with respect to handle 32 and therefore wedge-shaped members 37 occurs if the useful component of the force applied to shaft 31, that is the component in the direction of movement, that is along longitudinal axis A, is greater than the friction force generated by wedge-shaped members 37.

By increasing the angle $\alpha$ of wedge-shaped members 37 the friction force decreases, and conversely if the angle $\alpha$ of wedge-shaped members 37 is decreased the friction force A exerted by wedge-shaped members 37 on shaft 31 is increased, and therefore, other conditions being equal, wedge-shaped members 37 tend to engage shaft 31, preventing it from sliding into cavity 33.

Movement of shaft 31 with respect to handle 32 is immobilised when wedge-shaped members 37 abut against annular member 31*d* provided on second end 31*b* of shaft 31.

In order to bring first activation device 30 into non-working condition W' the operator grasps handle 32, pressing it towards first body 3, as illustrated by arrow F2 in FIG. 4. This causes movement between handle 32 and shaft 31 and the latter is progressively introduced into cavity 33.

In this movement shaft 31 moves with respect to wedge-shaped members 37, this movement being subject to friction through a friction coefficient which depends on the material used for shaft 31 and for wedge-shaped members 37.

Owing to the characteristics described above, supporting head 1 can be transported and stored in a configuration in which first and second activation devices 30, 40 are in a retracted position of minimum dimensions, thus minimising the overall dimensions of head 1.

When head 1 has to be placed in a working condition, first and second activation devices 30, 40 are instead moved into working configuration W. First and second activation devices 30, 40 thus make it possible to achieve a reduction in the dimensions of the head when one or both are in the closed transport configuration.

In the case of the heads normally used in the sector, first and second activation devices 30, 40 according to the invention make it possible to obtain a reduction of even 25-30% in the overall dimensions of the head in the non-working configuration.

This invention therefore overcomes the problem stated above, while at the same time providing many other advantages. Furthermore, by not introducing any play in the rotation mechanism of the activation devices which might disturb normal use of the activation devices in the working condition, the solution to which this invention relates makes it possible to obtain and maintain good adjustment of the equipment attached to the head according to the invention.

In a version of a head which is not illustrated the third body may also be provided with a telescopic activation device constructed in the same way as those described above.

In another version of the head according to the invention which is not shown only one of the bodies of the head is provided with a telescopic activation device such as those described above.

The invention claimed is:

1. A support head for video-photographic equipment comprising a base intended to be fixed to a support structure, at least one body rotating with respect to said base so as to rotate about a respective rotation axis (X, Y, Z) defined on said head, a telescopic activation device of said at least one body for rotating said body with respect to said rotation axis (X, Y, Z) comprising a shaft extending along a longitudinal axis fixed at a first end thereof to said at least one body and a handle associated with a second end of said shaft, longitudinally opposite to said first end, said handle being slidable with respect to said shaft so as to be displaceable along said longitudinal axis (A, B) between a working configuration (W), in which said handle is positioned for controlling the rotation of said at least one body about said rotation axis (X, Y, Z) and a non-working configuration (W') of minimum size, in which said handle is in a position close to said at least one body, wherein said handle is provided with a friction element interposed between said shaft and said handle and arranged to friction the sliding of said shaft with respect to said handle, wherein said friction element comprises at least one wedge-shaped element interposed between a wall (P) of a cavity of said handle and said shaft and the head further comprises a spring so configured as to push said friction element against a wall (P) of said handle to keep said friction element interposed in abutment against said wall (P) and said shaft.

2. The support head according to claim 1, wherein said handle is provided with a cavity extending along said longitudinal axis (A, B) and arranged to receive in a slidable manner at least a portion of said shaft.

3. The support head according to claim 2, wherein said at least one wedge-shaped element comprises an angle ($\alpha$) defined between said wall (P) and said shaft, having an amplitude greater than the minimum sliding angle between said shaft and said at least one wedge-shaped element.

4. The support head according to claim 3, wherein said at least one wedge-shaped element comprises three wedges provided in a circumferentially spaced position.

5. The support head according to claim 1, and further comprising three distinct bodies rotating about respective rotation axes (X, Y, Z), said rotation axes (X, Y, Z) being mutually perpendicular to each other.

6. The support head according to claim 1, wherein said at least one body is provided with a locking device to lock the rotation of said at least one body with respect to said respective rotation axes (X, Y, Z).

7. The support head according to claim 6, wherein said first end of said shaft is provided with a threaded portion, said activation device being rotating about said longitudinal axis (A, B) for screwing on/unscrewing from said at least one body said threaded portion for activating/deactivating said locking device to lock/allow rotation of said at least one body with respect to said rotation axis (X, Y, Z).

\* \* \* \* \*